(12) United States Patent
Zhuang et al.

(10) Patent No.: US 11,905,181 B2
(45) Date of Patent: Feb. 20, 2024

(54) METHOD FOR PREPARING CALCIUM OXIDE USING A MULTISTAGE SUSPENSION PREHEATER KILN

(71) Applicant: GUANGXI SIWEI MATERIALS TECHNOLOGY CO., LTD., Guangxi (CN)

(72) Inventors: Yan Zhuang, Guangxi (CN); Licheng Zhuang, Guangxi (CN); Qiancheng Zhuang, Guangxi (CN)

(73) Assignee: GUANGXI SIWEI MATERIALS TECHNOLOGY CO., LTD., Nanning (CN)

( * ) Notice: Subject to any disclaimer, the term of this patent is extended or adjusted under 35 U.S.C. 154(b) by 848 days.

(21) Appl. No.: 16/993,279

(22) Filed: Aug. 14, 2020

(65) Prior Publication Data

US 2021/0078869 A1    Mar. 18, 2021

(30) Foreign Application Priority Data

Sep. 12, 2019   (CN) .......................... 201910868473.6

(51) Int. Cl.
*C01F 11/06* (2006.01)
*B01J 3/00* (2006.01)
(Continued)

(52) U.S. Cl.
CPC .............. *C01F 11/06* (2013.01); *B01J 3/006* (2013.01); *B01J 6/002* (2013.01); *B01J 8/386* (2013.01);
(Continued)

(58) Field of Classification Search
CPC ... C01F 11/06; C01P 2004/60; C01P 2006/80; B01J 3/006; B01J 6/002; B01J 8/386;
(Continued)

(56) References Cited

U.S. PATENT DOCUMENTS

| 3,895,955 A * | 7/1975 | Kondo .................... C04B 7/434 |
| | | 106/771 |
| 2008/0032247 A1 * | 2/2008 | Nolan ................... F27B 7/3205 |
| | | 432/14 |

(Continued)

FOREIGN PATENT DOCUMENTS

| CN | 109836059 A | 6/2019 | |
| WO | WO-2015077818 A1 * | 6/2015 | ............. C04B 7/434 |

OTHER PUBLICATIONS

Mohamed A. Aldieb, Hesham G. Ibrahim. Variation of Feed Chemical Composition and Its Effect on Clinker Formation-Simulation Process Proceedings of the World Congress on Engineering and Computer Science 2010 vol. II WCECS 2010, Oct. 20-22, San Francisco, USA (2010) (Year: 2010).*

(Continued)

*Primary Examiner* — Anthony J Zimmer
*Assistant Examiner* — Zachary John Baum

(57) ABSTRACT

The disclosure discloses a method for preparing calcium oxide using multistage suspension preheater kiln. The steps of the method are: (1) the limestone powder is fed to the multistage suspension preheater kiln for preheating to 800° C. to 900° C.; (2) A preheated material is fed to a decomposition furnace, and calcined at 900° C. to 1100° C. for 25 s to 35 s; (3) A calcined material is fed to a rotary kiln, and calcined at 1100° C. to 1300° C. for 25 to 35 minutes, and finally cooled to obtain calcium oxide.

4 Claims, 1 Drawing Sheet

(51) Int. Cl.
| | |
|---|---|
| B01J 6/00 | (2006.01) |
| B01J 8/38 | (2006.01) |
| F27B 15/00 | (2006.01) |
| F27B 15/08 | (2006.01) |
| F27B 15/09 | (2006.01) |
| F27B 15/10 | (2006.01) |
| F27D 13/00 | (2006.01) |
| F27D 15/02 | (2006.01) |

(52) U.S. Cl.
CPC ............ *F27B 15/003* (2013.01); *F27B 15/08* (2013.01); *F27B 15/09* (2013.01); *F27B 15/10* (2013.01); *F27D 13/00* (2013.01); *F27D 15/02* (2013.01); *C01P 2004/60* (2013.01); *F27D 2013/007* (2013.01)

(58) Field of Classification Search
CPC .... B01J 6/001; B01J 6/004; B01J 8/14; F27B 15/003; F27B 15/08; F27B 15/09; F27B 15/10; F27D 13/00; F27D 15/02; F27D 2013/007; C04B 2/10; Y02P 20/10
See application file for complete search history.

(56) References Cited

U.S. PATENT DOCUMENTS

2014/0366779 A1* 12/2014 Schoon .................. C04B 16/02
 524/4
2016/0052822 A1* 2/2016 Gasser .................... C04B 7/43
 422/600

OTHER PUBLICATIONS

Mokrzycki, E. and Bochenczyk, A. U. Alternative fuels for the cement industry. Applied Energy 74 (2003) 95-100 (Year: 2003).*
Chatterjee, A.K. (2018). Cement Production Technology: Principles and Practice (1st ed.). CRC Press. https://doi.org/10.1201/9780203703335, pp. 152-153 (Year: 2018).*
T. Abbas, M. Akritopoulos and S. S. Akhtar, "Reducing pressure drop in pyro-processing," 2018 IEEE-IAS/PCA Cement Industry Conference (IAS/PCA), Nashville, TN, USA, 2018, pp. 1-11, doi: 10.1109/CITCON.2018.8373111 (Year: 2018).*
Mujumdar, K. S., et al. Modeling of Rotary Cement Kilns: Applications to Reduction in Energy Consumption Ind. Eng. Chem. Res. 2006, 45, 2315-2330 (Year: 2006).*

* cited by examiner

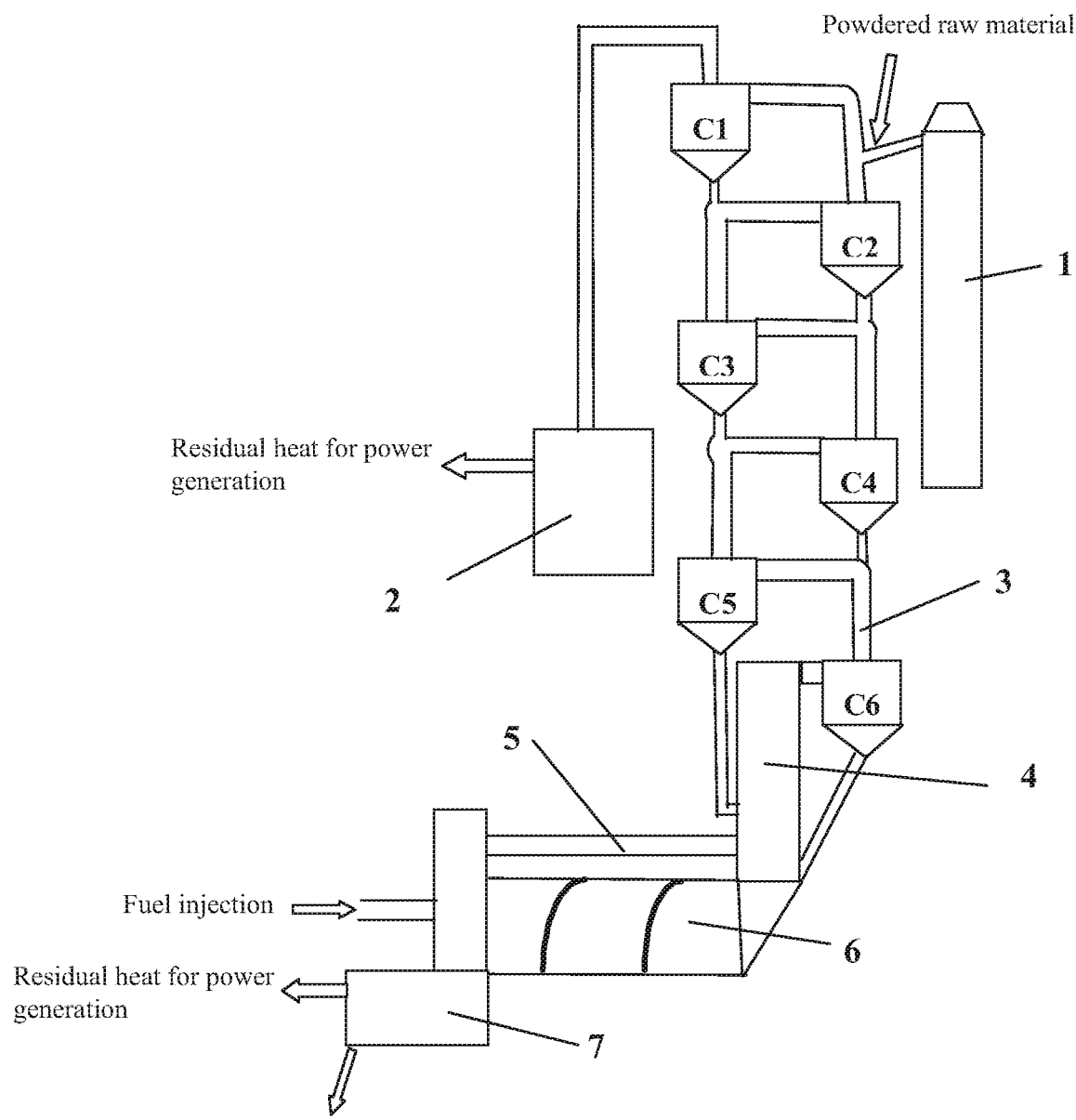

METHOD FOR PREPARING CALCIUM OXIDE USING A MULTISTAGE SUSPENSION PREHEATER KILN

RELATED APPLICATIONS

This application claims priority to Chinese Patent Application Number 201910868473.6, filed on Sep. 12, 2019, which is herein incorporated by reference.

TECHNICAL FIELD

The disclosure relates to the field of a method for preparing calcining calcium oxide, particularly to a method for preparing calcium oxide using a multistage suspension preheater kiln.

BACKGROUND

At present, two methods are mainly used for producing calcium oxide (lime). One method adopts a vertical kiln for calcining, the other method adopts a single-stage preheater rotary kiln for calcining.

The vertical kiln is for the calcination of bulk limestones with a particle size of 100 mm to 300 mm. During the calcination process, a proper fuel should be used, the fuel and the limestones enter the kiln synchronously and combust. In this process, bulk limestones are required to allow ventilation and combustion, resulting in slow combustion, low efficiency, high energy consumption, low yield, and poor product quality. Moreover, desulfurization and denitrification equipment is required for environmental protection, which results in a high production cost.

The single-stage preheater rotary kiln is for the calcination of limestones with a particle size of 40 mm to 80 mm. The material slowly enters the rotary kiln, and the fuel is injected into the kiln from the kiln head for combustion. The residual heat generated during the combustion in the rotary kiln flows upward and enters a single-stage preheater at the end of the kiln. Although the material is preheated to a certain degree, it has slow heat absorption and a large particle size, resulting in poor combustion, a long calcination and decomposition time, poor ventilation, and other problems. These problems give rise to a low yield, high energy consumption, poor product quality; in addition, desulfurization and denitrification equipment is also required for environmental protection.

These two conventional methods involve treating limestone lumps of different sizes through high-temperature calcination to transfer them into lime lumps, followed by grinding, hydration, and other processes to further process the lime into lime powder, lime putty (slaked lime), and other materials. The production capacities of these conventional processing methods are low: at present, the production capacity of a single machine is 100 to 800 tons per day. Furthermore, energy consumption is high: 3350 kJ/kg (200 kg of standard coal) of energy and 50 kwh of power are consumed.

SUMMARY

The objective of the present disclosure is to overcome the drawbacks of the prior art and to provide a method for preparing calcium oxide using a multistage suspension preheater kiln.

In order to achieve the objective of the disclosure, the technical solution of the present disclosure includes a method for preparing calcium oxide using a multistage suspension preheater kiln, comprising steps of:

A method for preparing calcium oxide using a multistage suspension preheater kiln, characterized in that the method comprises steps of:

(1) feeding limestone powder to the multistage suspension preheater kiln for preheating to 800° C. to 900° C.;

(2) feeding a preheated material to a decomposition furnace and calcining at 900° C. to 1100° C. for 25 s to 35 s;

(3) feeding a calcined material to a rotary kiln and calcining at 1100° C. to 1300° C. for 25 min to 35 min; cooling to obtain calcium oxide.

In the present disclosure, instead of adopting the prior art method of directly calcinating bulk limestones, powdered limestone is preheated in suspension, calcinated and decomposed in the decomposition furnace, calcinated and slaked in the rotary kiln to produce powdered calcium oxide. This process has a high production capacity and is energy efficient and environmentally friendly. According to actual needs, the multistage suspension preheater kiln can be divided into 2 or more stages, preferably 5 to 7 stages. The cooling may be performed in a cooler, the cooling method can be cold air cooling.

As a preferred embodiment of the method for preparing calcium oxide using a multistage suspension preheater kiln of the present disclosure, the multistage suspension preheater kiln comprises six-stage hot flue gas cyclones that are sequentially connected to a hot gas duct; the hot gas duct conveys hot flue gas upward; a first-stage hot flue gas cyclone on the hot gas duct is the topmost hot flue gas cyclone, and a material outlet of a fifth-stage hot flue gas cyclone connects to an inlet of a decomposition furnace.

As a preferred embodiment of the method for preparing calcium oxide using a multistage suspension preheater kiln of the present disclosure, a gas temperature in the first-stage hot flue gas cyclone is lower than that in a second-stage hot flue gas cyclone;

the second-stage hot flue gas cyclone has a gas temperature of 400° C. to 500° C. and a negative pressure of −4 kPa to −5 kPa;

a third-stage hot flue gas cyclone has a gas temperature of 500° C. to 600° C. and a negative pressure of −3.5 kPa to −4.5 kPa;

a fourth-stage hot flue gas cyclone has a gas temperature of 600° C. to 700° C. and a negative pressure of −2.5 kPa to −3.5 kPa;

the fifth-stage hot flue gas cyclone has a gas temperature of 800° C. to 900° C. and a negative pressure of −1.5 kPa to −2.5 kPa.

The temperature in the cyclone gradually increases from the first stage to the fifth stage, while the negative pressure gradually decreases from the first stage to the fifth stage. The inventor found that if the temperature in each stage of the hot flue gas cyclone is lower than the aforementioned value range, the product decomposition percentage would be low, and product quality would diminish; if the temperature in each stage of the hot flue gas cyclone is higher than the aforementioned value range, energy consumption would increase without any significant improvement in product quality. When the pressure in each stage of the hot flue gas cyclone is lower or higher than the aforementioned value range, the suspension of the powder in the cyclone would be adversely affected, resulting in uneven heating of the powder. This leads to decreased decomposition percentage and diminished product quality. When the temperature and pressure in each stage of the hot flue gas cyclone are within the aforementioned value ranges, the calcination in the subsequent decomposition furnace and rotary kiln produce desirable results: the products obtained satisfy the requirements for a special class product (calcium oxide content ≥92%, activity degree ≥360) or a first class product (calcium oxide content ≥90%, activity degree ≥320). When the temperature and pressure in each stage of the hot flue gas cyclone are not within the aforementioned value ranges, the calcium oxide obtained is of poor quality.

As a preferred embodiment of the method for preparing calcium oxide using a multistage suspension preheater kiln of the present disclosure, the negative pressure in the decomposition furnace is −0.9 kPa to −1.5 kPa. Under the temperature and pressure of the decomposition furnace, the decomposition percentage of the material can reach 90% or more to achieve optimal production capacity.

As a preferred embodiment of the method for preparing calcium oxide using a multistage suspension preheater kiln of the present disclosure, an end of the hot gas duct is provided with an exhaust device; a material outlet of the first-stage hot flue gas cyclone connects to a hot flue gas outlet duct of a third-stage hot flue gas cyclone, a material outlet of the third-stage hot flue gas cyclone connects to a hot flue gas outlet duct of the fifth-stage hot flue gas cyclone; a material outlet of a second-stage hot flue gas cyclone connects to a hot flue gas outlet duct of a fourth-stage hot flue gas cyclone, a material outlet of the fourth-stage hot flue gas cyclone connects to a hot flue gas outlet duct of a sixth-stage hot flue gas cyclone; a material at an outlet of the decomposition furnace connects to a feed pipe of the sixth-stage hot flue gas cyclone through a rising gas flow; a material outlet of the sixth-stage hot flue gas cyclone connects to a flue chamber of the rotary kiln; a powdered limestone raw material is fed through a hot gas duct between the first-stage hot flue gas cyclone and the second-stage hot flue gas cyclone.

As a preferred embodiment of the method for preparing calcium oxide using a multistage suspension preheater kiln of the present disclosure, a particle size of the limestone powder is less than 70 mesh. The limestone powder of this particle size matches the temperature and pressure in each stage of the multistage suspension preheater kiln, in the decomposition furnace, and in the rotary kiln. This leads to the formation of high-quality calcium oxide product and is more energy efficient.

As a preferred embodiment of the method for preparing calcium oxide using a multistage suspension preheater kiln of the present disclosure, the hot flue gas is a flue gas that is generated by the decomposition furnace and the rotary kiln. The hot flue gas in each stage of the multistage suspension preheater kiln may come from residual heat generated by calcination material in the decomposition furnace and the rotary kiln fuel. This permits full utilization of the residual heat.

As a preferred embodiment of the method for preparing calcium oxide using a multistage suspension preheater kiln of the present disclosure, the fuel used for calcination in the rotary kiln is petroleum coke. In the present disclosure, petroleum coke is the heat source instead of coal, it rapidly combusts in a multi-channel burner under high pressure (12 kPa or higher). It has a low ash content of less than 0.33% (whereas that of conventional coal is 10% or more), greatly reducing the amount of impurities in the finished product. The heating value of petroleum coke is 8300 kcal or higher (whereas that of coal is 6000 kcal or lower). Petroleum coke saves energy and has a high combustion efficiency.

As a preferred embodiment of the method for preparing calcium oxide using a multistage suspension preheater kiln of the present disclosure, a wind pressure in the rotary kiln is 12 kPa and a rotating speed of the rotary kiln is 3.5 rpm.

As a preferred embodiment of the method for preparing calcium oxide using a multistage suspension preheater kiln of the present disclosure, a gas temperature in the sixth-stage hot flue gas cyclone is 950° C. to 1130° C., a negative pressure in the sixth-stage hot flue gas cyclone is −1.0 kPa to −2.0 kPa.

The beneficial effects of the present disclosure are as follows: the disclosure provides the method for preparing calcium oxide using a multistage suspension preheater kiln, compared with the prior art, the method of the disclosure has the following advantages.

1) In the present disclosure, powdered limestone is preheated by a multistage suspension preheater kiln, then calcined in suspension at a high temperature in a decomposition furnace outside the multistage suspension preheater kiln, and finally calcined in a rotary kiln. The method of the present disclosure has a high yield; the production capacity of a single machine is up to 6000 tons/day, and energy consumption per ton of product is below 100 kg standard coal.

2) At present, the coal consumption in obtaining one ton of product through a conventional vertical kiln or a single-stage preheater rotary kiln is about 250 kg standard coal. In contrast, in the method of the present disclosure, the energy consumption per ton of product is below 100 kg standard coal.

Furthermore, as calcium carbonate powder is first preheated in suspension, then calcined in suspension in the decomposition furnace outside the multistage suspension preheater kiln, the calcium carbonate quickly and fully decomposed. The products have a high pass rate and is of high quality. In addition, both overcalcination and undercalcination are prevented, coal consumption is decreased by at least one fold.

3) Long service life of kiln lining and high operation efficiency: a reduction in the kiln heat load leads to an extended service life of the refractory bricks of the rotary kiln. As a result, the unit consumption of refractory materials can be reduced.

4) The method of the present disclosure generates less NO and is less polluting: since 50%-60% of the fuel is transferred from the kiln to the decomposition furnace for combustion, $SO_2$ and NO generated by combustion are absorbed by the powdered calcium carbonate when they enter the multistage hot flue gas cyclones. After reacting at a high temperature, inorganic sulfur is generated and discharged. NO production is reduced by controlling the amount of materials fed, adjusting gas temperature and pressure, and adjusting fuel consumption. This eliminates the need for an emission treatment equipment, reducing cost.

5) In large scale production, using method of the present disclosure, the production capacity of a single set of device is higher than the production capacity of multiple sets of devices of the prior art. Hence, the present disclosure requires a smaller area to achieve a certain production capacity when compared with the prior art. The equipment of the present disclosure is easy to manufacture and install. Equipment costs and construction costs are lower.

BRIEF DESCRIPTION OF DRAWINGS

The sole FIGURE is a structural diagram of a processing system used in a method for preparing calcium oxide using a multistage suspension preheater kiln according to an embodiment of the present disclosure. The reference numerals and symbols are as follows:

1. lifting apparatus; 2. exhaust device; 3. hot gas duct; 4. decomposition furnace; 5. tertiary hot gas tube; 6. rotary kiln; 7. cooler; C1. first-stage hot flue gas cyclone; C2. second-stage hot flue gas cyclone; C3. third-stage hot flue gas cyclone; C4. fourth-stage hot flue gas cyclone; C5. fifth-stage hot flue gas cyclone; C6. sixth-stage hot flue gas cyclone.

DETAILED DESCRIPTION OF ILLUSTRATED EMBODIMENTS

In order to better illustrate the purpose, technical scheme and advantages of the disclosure, the disclosure will be further illustrated in conjunction with the drawing and embodiments.

Embodiment 1

As shown in sole FIGURE, the processing system used in the method for preparing calcium oxide using a multistage suspension preheater kiln described in this embodiment comprises six-stage hot flue gas cyclones C1 to C6, a decomposition furnace 4, a rotary kiln 6, and a cooler 7. The rotary kiln 6 is provided with a fuel injection inlet. A tertiary hot gas tube 5 is provided between the fuel injection inlet of the rotary kiln 6 and the decomposition furnace 4. A flue chamber of the rotary kiln 6 connects to the decomposition furnace 4 and a hot gas duct 3. An outlet of the rotary kiln 6 connects to the cooler 7.

The six-stage hot flue gas cyclones C1 to C6 are sequentially connected to the hot gas duct 3, the hot gas duct 3 conveys hot flue gas upward. An exhaust device 2 is installed at an end of the hot gas duct 3. The topmost hot flue gas cyclone is the first-stage hot flue gas cyclone C1. The material outlet of the first-stage hot flue gas cyclone C1 connects to the hot flue gas outlet duct of the third-stage hot flue gas cyclone C3; the material outlet of the third-stage hot flue gas cyclone C3 connects to the hot flue gas outlet duct of the fifth-stage hot flue gas cyclone C5; the material outlet of the fifth-stage hot flue gas cyclone C5 connects to the inlet of the decomposition furnace 4; the material outlet of the second-stage hot flue gas cyclone C2 connects to the hot flue gas outlet duct of the fourth-stage hot flue gas cyclone C4; the material outlet of the fourth-stage hot flue gas cyclone C4 connects to the hot flue gas outlet duct of the sixth-stage hot flue gas cyclone C6. The material at the outlet of the decomposition furnace 4 connects to a feed pipe of the sixth-stage hot flue gas cyclone C6 through a rising gas flow. The material outlet of the sixth-stage hot flue gas cyclone C6 connects to the flue chamber of the rotary kiln 6. The powdered limestone raw material is fed through the hot gas duct between the first-stage hot flue gas cyclone C1 and the second-stage hot flue gas cyclone C2.

When the equipment is operating, the limestone powdered raw material, which is crushed into a particle size of less than 70 mesh, is lifted by a lifting apparatus 1 and fed into the hot gas duct 3 between the first-stage hot flue gas cyclone C1 and the second-stage hot flue gas cyclone C2. Under the action of the exhaust device 2, the gas temperature in the second-stage hot flue gas cyclone C2 is controlled at 400° C. to 500° C., and the negative pressure in the second-stage hot flue gas cyclone C2 is controlled at −4 kPa to −5 kPa. After the fed material absorbed heat in the first-stage hot flue gas cyclone C1, the gas temperature in the first-stage hot flue gas cyclone C1 is lower than the gas temperature in the second-stage hot flue gas cyclone C2. The gas temperature in the third-stage hot flue gas cyclone C3 is controlled at 500° C. to 600° C., the negative pressure of the third-stage hot flue gas cyclone C3 is controlled at −3.5 kPa to −4.5 kPa; the gas temperature in the fourth-stage hot flue gas cyclone C4 is controlled at 600° C. to 700° C., the negative pressure of the fourth-stage hot flue gas cyclone C4 is controlled at −2.5 kPa to −3.5 kPa; the gas temperature in the fifth-stage hot flue gas cyclone C5 is controlled at 800° C. to 900° C., the negative pressure of the fifth-stage hot flue gas cyclone C5 is controlled at −1.5 kPa to −2.5 kPa. In the decomposition furnace 4, the calcination temperature is controlled at 900° C. to 1100° C., the negative pressure is controlled at −0.9 kPa to −1.5 kPa, the gas velocity is 8.0 m/s to 8.6 m/s, calcination and decomposition is performed for 25 s to 35 s, the percentage of material decomposed during calcination reaches 90% or more. The temperature in the rotary kiln 6 is controlled at 1100° C. to 1300° C., and calcination is performed for 25 to 35 minutes. Cold wind can be employed in the cooler 7 to cool the material.

The hot flue gas in the six-stage hot flue gas cyclones C1 to C6 may come from residual heat generated by calcination in the decomposition furnace and the rotary kiln. This permits full utilization of the residual heat, reducing energy consumption.

In the present disclosure, the specific operation steps of the method for preparing calcium oxide using a multistage suspension preheater kiln of the present disclosure are as follows:

(1) Limestone powder with a particle size of less than 70 mesh is fed to the multistage suspension preheater kiln and is preheated to above 800° C.

(2) The preheated material is fed to the decomposition furnace 4 from the material outlet of the fifth-stage hot flue gas cyclone C5 and is calcined at 900° C. to 1100° C.

(3) The material calcinated in the decomposition furnace 4 accumulates in the sixth-stage hot flue gas cyclone C6 under the action of the rising flue gas. Then, the material is fed to the rotary kiln 6 together with the material falling from the decomposition furnace 4. After calcined at 1100° C. to 1300° C., the material is fed to the cooler 7 for cooling treatment. Calcium oxide is obtained after cooling to room temperature.

The rotary kiln 6 described in this embodiment is provided with a fuel injection inlet. Through the tertiary hot gas tube 5, high-temperature hot gas generated by the cooling of the finished product at the kiln head is directed to the decomposition furnace 4 to assist combustion. Residual heat discharged from the exhaust device 2 and the cooler 7 can be used in power generation or in other aspects, allowing utilization of the residual heat. The fuel used in the rotary kiln 6 is petroleum coke. Petroleum coke is the heat source instead of coal; it rapidly combusts in a multi-channel burner under high pressure (12 kPa or higher). It has a low ash content of less than 0.33% (whereas that of conventional coal is 10% or more), greatly reducing the amount of impurities in the finished product. The heating value of petroleum coke is 8300 kcal or higher (whereas that of coal is 6000 kcal or lower). Petroleum coke saves energy and has a high combustion efficiency.

In the method of this embodiment, after limestone is crushed and ground, it is sent to a top duct of the second-stage cyclone C2 by the lifting apparatus 1. The gas velocity and the gas volume in the entire system are controlled by the exhaust device 2. After the material enters the hot gas duct between the first-stage hot flue gas cyclone C1 and the second-stage hot flue gas cyclone C2, it is held in suspension by a gas flow to absorb heat, and then accumulates in the first-stage hot flue gas cyclone C1. The accumulated and preheated material enters an air duct at the top of cyclone C3 from the duct at the bottom of cyclone C1. The material is suspended and preheated by the rising hot gas flow in the communicating air duct between cyclone C3 and cyclone C2. After being accumulated by cyclone C2, the material enters the communicating air duct between cyclone C4 and cyclone C3 from the duct at the bottom of cyclone C2. The material is suspended and preheated by a hot gas flow, and is then lifted to enter cyclone C3. After being accumulated by cyclone C3, the material enters the communicating air duct between cyclone C5 and cyclone C4 to be suspended and preheated again. The material enters cyclone C4 with the rising gas flow. After being accumulated by cyclone C4, the material enters the communicating air duct between cyclone C6 and cyclone C5 from the duct at the bottom of cyclone C4. Similarly, the material is suspended and preheated by a gas flow. At this point, the material has reached 800° C. or higher and has been partially decomposed. The material is lifted to enter cyclone C5. After being accumulated by cyclone C5, the material is sent to the decomposition furnace 4. The material is held in suspension and is quickly calcined to decompose at a high temperature 900° C. to 1100° C. in the decomposition furnace. The temperature in the decomposition furnace is controlled by controlling the amount of injected fuel. After calcining in the decomposition furnace, the decomposition percentage reaches 90% or more. The material enters cyclone C6 together with the rising gas flow in the decomposition furnace. After being accumulated by cyclone C6, the material enters the rotary kiln 6 via a bottom duct. At this point, the material entering the rotary kiln is a fluid. It is then rotated and tumbled in the rotary kiln. After a small amount of fuel is burned, the material is calcined at 1100° C. to 1300° C. to complete decomposition. The temperature in the kiln is controlled by controlling the amount of fuel injected at the kiln head. After completely decomposed and slaked, the material enters the cooler 7 and is discharged to storage after cooling to normal temperature.

The disclosure adopts multistage suspension preheating, in which the material is continuously suspended and preheated in the multistage cyclone to absorb heat. After being preheated at a high temperature, the material enters the decomposition furnace, is continuously suspended, and is rapidly calcined and decomposed under burning fuel. This increases combustion efficiency and greatly reduces energy consumption.

In the present disclosure, since the fine powder repeatedly absorbs heat through suspension preheating and is calcined in suspension, energy consumption is significantly lower than that of conventional bulk lime calcination, reaching below 100 kg standard coal/ton. Both the production capacity of one line and production efficiency are 5 to 10 times higher than those of the prior art. The discharged $SO_3$ and $NO_x$ ($NO_2$) fully mix with and are absorbed by the powdered calcium carbonate in the kiln during the suspension preheating process (calcium carbonate is a desulfurization and denitrification material). Then, the powdered calcium carbonate is transferred to the decomposition kiln for high-temperature calcination, forming inorganic sulfur and the final solid product, which are both discharged. As a result, the emission is greatly decreased, reducing the impact on the environment.

Calcium carbonate is a major desulfurization material. It reacts with $SO_2$ during calcination to generate mineral sulfur. The fully absorbed $SO_2$ is then transferred to the decomposition furnace, in which it reacts under high temperature to generate inorganic sulfur before being discharged. This eliminates the need for an emission treatment equipment, reducing cost.

Embodiment 2

In this embodiment, the treatment system described in embodiment 1 is used to prepare calcium oxide. The production capacity is 2250 tons/day. The sizes of hot flue gas cyclones employed in each stage are as follows: cyclone C1 has a diameter of 5.67 m and a height of 5.35 m; cyclone C2 has a diameter of 6.58 m and a height of 5.83 m; cyclone C3 has a diameter of 6.96 m and a height of 6.93 m; cyclone C4 has a diameter of 7.15 m and a height of 5.58 m; cyclone C5 has a diameter of 7.86 m and a height of 5.91 m; cyclone C6 has a diameter of 7.93 m and a height of 5.98 m; the decomposition furnace has a diameter of 6.8 m and a height of 13.5 m; the rotary kiln has a size of $\Phi$ 4.2×60 m and a speed of 3.5 rpm.

The specific method is as follows: a limestone is crushed into a powdered raw material with a particle size of less than 70 mesh, and the raw material is fed to the communicating duct between the first-stage hot flue gas cyclone C1 and the second-stage hot flue gas cyclone C2 at 180 tons per hour by a lifting apparatus for suspension preheating, and then enters the first-stage hot flue gas cyclone C1 for suspension preheating, after that, the material enters the hot gas duct between the second-stage hot fuel gas cyclone C2 and the third-stage hot flue gas cyclone C3 for suspension preheating, and the material is brought into the second-stage hot flue gas cyclone C2 by the hot gas flow to accumulate and preheat. At this point, the gas temperature in the second-stage hot flue gas cyclone C2 is controlled to 350° C. (T2), under the control of the exhaust device, the negative pressure in the second-stage hot flue gas cyclone C2 is −3.4 kPa (P2). the raw material is separated and accumulated by suspension preheating cyclones, and enters into the hot gas duct between the third-stage hot flue gas cyclone C3 and the fourth-stage hot flue gas cyclone C4 for suspension preheating. the material is brought into the third-stage hot flue gas cyclone C3 by the hot gas flow to accumulate and preheat. At this point, the third-stage hot flue gas cyclone C3 has a gas temperature of 450° C. (T3) and a negative pressure of −3.1 kPa (P3). The material is separated and accumulated by suspension preheating cyclone in the third-stage hot flue gas cyclone C3, and then enters the hot gas duct between the fourth-stage hot flue gas cyclone C4 and the fifth-stage hot flue gas cyclone C5, the material is brought into the fourth-stage hot flue gas cyclone C4 by hot gas flow to accumulate and for suspension preheating. At this point, the fourth-stage hot flue gas cyclone C4 has a temperature of 550° C. (T4), and a negative pressure of −2.3 kPa (P4). The material is separated and accumulated by suspension preheating cyclone in the fourth-stage hot flue gas cyclone C4, and then enters the hot gas duct between the fifth-stage hot flue gas cyclone C5 and the sixth-stage hot flue gas cyclone C6, the material is brought into the fifth stage hot flue gas cyclone C5 to accumulate and for suspension preheating. The fifth-stage hot flue gas cyclone C5 has a temperature of 750° C. (T5) and a negative pressure of −1.5 kPa (P5). At this point, the raw material has been partially decomposed, and the temperature of the material has reached 650° C. or more. The material is separated and accumulated by the cyclone in the fifth-stage hot flue gas cyclone C5, and then enters the decomposition furnace to calcine and decompose. The decomposition furnace has a temperature of 850° C. (T6) and a negative pressure of −0.85 kPa (P5), and the calcination is performed for 30 s. The material in the suspended state is rapidly calcined and decomposed in the decomposition furnace, and the decomposition percentage is 80% or more. The material is brought into the sixth-stage hot flue gas cyclone C6 again by the hot gas, and then is separated and accumulated by the cyclone of the sixth-stage hot flue gas cyclone C6, At this point, the material entering the rotary kiln is as fluid, and then the material is rotated and tumbled by the rotary kiln, the temperature in the kiln is controlled to 1200° C. (T7), the calcination is performed for 30 min, the material is completely decomposed after a small amount of fuel is burned, and finally is cooled by the cooler to storage after cooling to room temperature. The finished product is produced at 95 tons/hour, about 2250 tons/day. Testing shows that the yield and quality of the product do not meet the standard. Energy consumption per ton of product is 95 kg standard coal, calcium oxide content reaches 85%, activity index is 300.

Embodiment 3

The treatment system used in this embodiment is the same as that described in embodiment 2, the specific method is: a limestone is crushed into a powdered raw material with a particle size of less than 70 mesh, and the raw material is fed to the communicating duct between the first-stage hot flue gas cyclone C1 and the second-stage hot flue gas cyclone C2 at 195 tons per hour by a lifting apparatus for suspension preheating, and then enters the first-stage hot flue gas cyclone C1 for suspension preheating, after that, the material enters the hot gas duct between the second-stage hot fuel gas cyclone C2 and the third-stage hot flue gas cyclone C3 for suspension preheating, and the material is brought into the second-stage hot flue gas cyclone C2 by the hot gas flow to accumulate and preheat. At this point, the gas temperature in the second-stage hot flue gas cyclone C2 is controlled to 400° C. (T2), under the control of the exhaust device, the negative pressure in the second-stage hot flue gas cyclone C2 is −4 kPa (P2). The raw material is separated and accumulated by suspension preheating cyclones, and enters into the hot gas duct between the third-stage hot flue gas cyclone C3 and the fourth-stage hot flue gas cyclone C4 for suspension preheating. The material is brought into the third-stage hot flue gas cyclone C3 by the hot gas flow to accumulate and preheat. At this point, the third-stage hot flue gas cyclone C3 has a gas temperature of 500° C. (T3) and a negative pressure of −3.5 kPa (P3). The material is separated and accumulated bysuspension preheating cyclone in the third-stage hot flue gas cyclone C3, and then enters the hot gas duct between the fourth-stage hot flue gas cyclone C4 and the fifth-stage hot flue gas cyclone C5, the material is brought into the fourth-stage hot flue gas cyclone C4 by hot gas flow to accumulate and for suspension preheating. At this point, the fourth-stage hot flue gas cyclone C4 has a temperature of 600° C. (T4), and a negative pressure of −2.5 kPa (P4). The material is separated and accumulated by suspension preheating cyclone in the fourth-stage hot flue gas cyclone C4, and then enters the hot gas duct between the fifth-stage hot flue gas cyclone C5 and the sixth-stage hot flue gas cyclone C6, the material is brought into the fifth stage hot flue gas cyclone C5 to accumulate and for suspension preheating. The fifth-stage hot flue gas cyclone C5 has a temperature of 800° C. (T5) and a negative pressure of −1.5 kPa (P5). At this point, the raw material has been partially decomposed, and the temperature of the material has reached 680° C. or more. The material is separated and accumulated by the cyclone in the fifth-stage hot flue gas cyclone C5, and then enters the decomposition furnace to calcine and decompose. The decomposition furnace has a temperature of 950° C. (T6) and a negative pressure of −0.9 kPa (P6), and the calcination is performed for 30 s. The material in the suspended state is rapidly calcined and decomposed in the decomposition furnace, and the decomposition percentage reaches 85% or more. The material is brought into the sixth-stage hot flue gas cyclone C6 again by the hot gas, and then is separated and accumulated by the cyclone of the sixth-stage hot flue gas cyclone C6, at this point, the material entering the rotary kiln is as fluid, and then the material is rotated and tumbled by the rotary kiln, the temperature in the kiln is controlled to 1200° C. (T7), the calcination is performed for 30 min, the material is completely decomposed after a small amount of fuel is burned, and finally is cooled by the cooler to storage after cooling to room temperature. The finished products is produced at 100 tons/hour, about 2400 tons/day. After calculating, the actual yield of calcium oxide goes beyond a calculated target yield of calcium oxide. Energy consumption per ton of product is 95 kg standard coal, calcium oxide content reaches 90% or more, activity index is 360 or more.

Embodiment 4

The treatment system used in this embodiment is the same as that described in embodiment 2, the specific method is: a limestone is crushed into a powdered raw material with a particle size of less than 70 mesh, and the raw material is fed to the communicating duct between the first-stage hot flue gas cyclone C1 and the second-stage hot flue gas cyclone C2 at 200 tons per hour by a lifting apparatus for suspension preheating, and then enters the first-stage hot flue gas cyclone C1 for suspension preheating, after that, the material enters the hot gas duct between the second-stage hot fuel gas cyclone C2 and the third-stage hot flue gas cyclone C3 for suspension preheating, and the material is brought into the second-stage hot flue gas cyclone C2 by the hot gas flow to accumulate and preheat. At this point, the gas temperature in the second-stage hot flue gas cyclone C2 is controlled to 420° C. (T2), under the control of the exhaust device, the negative pressure in the second-stage hot flue gas cyclone C2 is −4.2 kPa (P2). The raw material is separated and accumulated by suspension preheating cyclones, and enters into the hot gas duct between the third-stage hot flue gas cyclone C3 and the fourth-stage hot flue gas cyclone C4 for suspension preheating. The material is brought into the third-stage hot flue gas cyclone C3 by the hot gas flow to accumulate and preheat. At this point, the third-stage hot flue gas cyclone C3 has a gas temperature of 520° C. (T3) and a negative pressure of −3.7 kPa (P3). The material is separated and accumulated by suspension preheating cyclone in the third-stage hot flue gas cyclone C3, and then enters the hot gas duct between the fourth-stage hot flue gas cyclone C4 and the fifth-stage hot flue gas cyclone C5, the material is brought into the fourth-stage hot flue gas cyclone C4 by hot gas flow to accumulate and for suspension preheating. At this point, the fourth-stage hot flue gas cyclone C4 has a temperature of 620° C. (T4), and a negative pressure of −2.7 kPa (P4). The material is separated and accumulated by suspension preheating cyclone in the fourth-stage hot flue gas cyclone C4, and then enters the hot gas duct between the fifth-stage hot flue gas cyclone C5 and the sixth-stage hot flue gas cyclone C6, the material is brought into the fifth stage hot flue gas cyclone C5 to accumulate and for suspension preheating. The fifth-stage hot flue gas cyclone C5 has a temperature of 820° C. (T5) and a negative pressure of −1.8 kPa (P5). At this point, the raw material has been partially decomposed, and the temperature of the material has reached 700° C. or more. The material is separated and accumulated by the cyclone in the fifth-stage hot flue gas cyclone C5, and then enters the decomposition furnace to calcine and decompose. The decomposition furnace has a temperature of 950° C. (T6) and a negative pressure of −0.95 kPa (P6), and the calcination is performed for 25 s. The material in the suspended state is rapidly calcined and decomposed in the decomposition furnace, and the decomposition percentage reaches 90% or more. The material is brought into the sixth-stage hot flue gas cyclone C6 again by the hot gas, and then is separated and accumulated by the cyclone of the sixth-stage hot flue gas cyclone C6, at this point, the material entering the rotary kiln is as fluid, and then the material is rotated and tumbled by the rotary kiln, the temperature in the kiln is controlled to 1150° C. (T7), the calcination is performed for 35 min, the material is completely decomposed after a small amount of fuel is burned, and finally is cooled by the cooler to storage after cooling to room temperature. The finished products is produced at 102 tons/hour, about 2400 tons/day. After calculating, the actual yield of calcium oxide goes beyond a calculated target yield of calcium oxide. Energy consumption per ton of product is 95 kg standard coal, calcium oxide content reaches 94% or more, activity index is 430 or more.

Embodiment 5

The treatment system used in this embodiment is the same as that described in embodiment 2, the specific method is: a limestone is crushed into a powdered raw material with a particle size of less than 70 mesh, and the raw material is fed to the hot gas duct between the first-stage hot flue gas cyclone C1 and the second-stage hot flue gas cyclone C2 at 205 tons per hour by a lifting apparatus for suspension preheating, and then enters the first-stage hot flue gas cyclone C1 for suspension preheating, after that, the material enters the hot gas duct between the second-stage hot fuel gas cyclone C2 and the third-stage hot flue gas cyclone C3 for suspension preheating, and the material is brought into the second-stage hot flue gas cyclone C2 by the hot gas flow to accumulate and preheat. At this point, the gas temperature in the second-stage hot flue gas cyclone C2 is controlled to 450° C. (T2), under the control of the exhaust device, the negative pressure in the second-stage hot flue gas cyclone C2 is −4.5 kPa (P2). The raw material is separated and accumulated by suspension preheating cyclones, and enters into the hot gas duct between the third-stage hot flue gas cyclone C3 and the fourth-stage hot flue gas cyclone C4 for suspension preheating. the material is brought into the third-stage hot flue gas cyclone C3 by the hot gas flow to accumulate and preheat. At this point, the third-stage hot flue gas cyclone C3 has a gas temperature of 550° C. (T3) and a negative pressure of −4 kPa (P3). The material is separated and accumulated by suspension preheating cyclone in the third-stage hot flue gas cyclone C3, and then enters the hot gas duct between the fourth-stage hot flue gas cyclone C4 and the fifth-stage hot flue gas cyclone C5, the material is brought into the fourth-stage hot flue gas cyclone C4 by hot gas flow to accumulate and for suspension preheating. At this point, the fourth-stage hot flue gas cyclone C4 has a temperature of 650° C. (T4), and a negative pressure of −3 kPa (P4). The material is separated and accumulated by suspension preheating cyclone in the fourth-stage hot flue gas cyclone C4, and then enters the hot gas duct between the fifth-stage hot flue gas cyclone C5 and the sixth-stage hot flue gas cyclone C6, the material is brought into the fifth stage hot flue gas cyclone C5 to accumulate and for suspension preheating. The fifth-stage hot flue gas cyclone C5 has a temperature of 850° C. (T5) and a negative pressure of −2 kPa (P5). At this point, the raw material has been partially decomposed, and the temperature of the material has reached 700° C. or more. The material is separated and accumulated by the cyclone in the fifth-stage hot flue gas cyclone C5, and then enters the decomposition furnace to burn and decompose. The decomposition furnace has a temperature of 1000° C. (T6) and a negative pressure of −1 kPa (P6), and the calcination is performed for 35 s. The material in the suspended state is rapidly calcined and decomposed in the decomposition furnace, and the decomposition percentage reaches 95% or more. The material is brought into the sixth-stage hot flue gas cyclone C6 again by the hot gas, and then is separated and accumulated by the cyclone of the sixth-stage hot flue gas cyclone C6, at this point, the material entering the rotary kiln is as fluid, and then the material is rotated and tumbled by the rotary kiln, the temperature in the kiln is controlled to 1200° C. (T7), the calcination is performed for 25 min, the material is completely decomposed after a small amount of fuel is burned, and finally is cooled by the cooler to storage after cooling to room temperature. The finished products is produced at 108 tons/hour, about 2550 tons/day. After calculating, the actual yield of calcium oxide goes beyond a calculated target yeild of calcium oxide. Energy consumption per ton of product is 95 kg standard coal, calcium oxide content reaches 96% or more, activity index is 440 or more.

Embodiment 6

The treatment system used in this embodiment is the same as that described in embodiment 2, the specific method is: a limestone is crushed into a powdered raw material with a particle size of less than 70 mesh, and the raw material is fed to the hot gas duct between the first-stage hot flue gas cyclone C1 and the second-stage hot flue gas cyclone C2 at 207 tons per hour by a lifting apparatus for suspension preheating, and then enters the first-stage hot flue gas cyclone C1 for suspension preheating, after that, the material enters the hot gas duct between the second-stage hot fuel gas cyclone C2 and the third-stage hot flue gas cyclone C3 for suspension preheating, and the material is brought into the second-stage hot flue gas cyclone C2 by the hot gas flow to accumulate and preheat. At this point, the gas temperature in the second-stage hot flue gas cyclone C2 is controlled to 500° C. (T2), under the control of the exhaust device, the negative pressure in the second-stage hot flue gas cyclone C2 is −5 kPa (P2). the raw material is separated and accumulated by suspension preheating cyclones, and enters into the hot gas duct between the third-stage hot flue gas cyclone C3 and the fourth-stage hot flue gas cyclone C4 for suspension preheating. the material is brought into the third-stage hot flue gas cyclone C3 by the hot gas flow to accumulate and preheat. At this point, the third-stage hot flue gas cyclone C3 has a gas temperature of 600° C. (T3) and a negative pressure of −4.5 kPa (P3). The material is separated and accumulated by suspension preheating cyclone in the third-stage hot flue gas cyclone C3, and then enters the hot gas duct between the fourth-stage hot flue gas cyclone C4 and the fifth-stage hot flue gas cyclone C5, the material is brought into the fourth-stage hot flue gas cyclone C4 by hot gas flow to accumulate and for suspension preheating. At this point, the fourth-stage hot flue gas cyclone C4 has a temperature of 700° C. (T4), and a negative pressure of −3.5 kPa (P4). The material is separated and accumulated by suspension preheating cyclone in the fourth-stage hot flue gas cyclone C4, and then enters the hot gas duct between the fifth-stage hot flue gas cyclone C5 and the sixth-stage hot flue gas cyclone C6, the material is brought into the fifth stage hot flue gas cyclone C5 to accumulate and for suspension preheating. The fifth-stage hot flue gas cyclone C5 has a temperature of 900° C. (T5) and a negative pressure of −2.5 kPa (P5). At this point, the raw material has been partially decomposed, and the temperature of the material has reached 800° C. or more. The material is separated and accumulated by the cyclone in the fifth-stage hot flue gas cyclone C5, and then enters the decomposition furnace to burn and decompose. The decomposition furnace has a temperature of 1150° C. (T6) and a negative pressure of −1.5 kPa (P6), and the calcination is performed for 30 s. The material in the suspended state is rapidly calcined and decomposed in the decomposition furnace, and the decomposition percentage reaches 95% or more. The material is brought into the sixth-stage hot flue gas cyclone C6 again by the hot gas, and then is separated and accumulated by the cyclone of the sixth-stage hot flue gas cyclone C6, at this point, the material entering the rotary kiln is as fluid, and then the material is rotated and tumbled by the rotary kiln, the temperature in the kiln is controlled to 1300° C. (T7), the calcination is performed for 30 min, the material is completely decomposed after a small amount of fuel is burned, and finally is cooled by the cooler to storage after cooling to room temperature. The finished products is produced at 111 tons/hour, about 2660 tons/day. After calculating, the actual yield of calcium oxide goes beyond a calculated target yield of calcium oxide. Energy consumption per ton of product is 100 kg standard coal, calcium oxide content reaches 96% or more, activity index is 440 or more.

Embodiment 7

The treatment system used in this embodiment is the same as that described in embodiment 2, the specific method is: a limestone is crushed into a powdered raw material with a particle size of less than 70 mesh, and the raw material is fed to the hot gas duct between the first-stage hot flue gas cyclone C1 and the second-stage hot flue gas cyclone C2 at 208 tons per hour by a lifting apparatus for suspension preheating, and then enters the first-stage hot flue gas cyclone C1 for suspension preheating, after that, the material enters the communicating duct between the second-stage hot fuel gas cyclone C2 and the third-stage hot flue gas cyclone C3 for suspension preheating, and the material is brought into the second-stage hot flue gas cyclone C2 by the hot gas flow to accumulate and preheat. At this point, the gas temperature in the second-stage hot flue gas cyclone C2 is controlled to 550° C. (T2), under the control of the exhaust device, the negative pressure in the second-stage hot flue gas cyclone C2 is −5.8 kPa (P2). the raw material is separated and accumulated by suspension preheating cyclones, and enters into the hot gas duct between the third-stage hot flue gas cyclone C3 and the fourth-stage hot flue gas cyclone C4 for suspension preheating. the material is brought into the third-stage hot flue gas cyclone C3 by the hot gas flow to accumulate and preheat. At this point, the third-stage hot flue gas cyclone C3 has a gas temperature of 650° C. (T3) and a negative pressure of −4.8 kPa (P3). The material is separated and accumulated by suspension preheating cyclone in the third-stage hot flue gas cyclone C3, and then enters the hot gas duct between the fourth-stage hot flue gas cyclone C4 and the fifth-stage hot flue gas cyclone C5, the material is brought into the fourth-stage hot flue gas cyclone C4 by hot gas flow to accumulate and for suspension preheating. At this point, the fourth-stage hot flue gas cyclone C4 has a temperature of 750° C. (T4), and a negative pressure of −3.6 kPa (P4). The material is separated and accumulated by suspension preheating cyclone in the fourth-stage hot flue gas cyclone C4, and then enters the hot gas duct between the fifth-stage hot flue gas cyclone C5 and the sixth-stage hot flue gas cyclone C6, the material is brought into the fifth stage hot flue gas cyclone C5 to accumulate and for suspension preheating. The fifth-stage hot flue gas cyclone C5 has a temperature of 950° C. (T5) and a negative pressure of −2.5 kPa (P5). At this point, the raw material has been partially decomposed, and the temperature of the material has reached 900° C. or more. The material is separated and accumulated by the cyclone in the fifth-stage hot flue gas cyclone C5, and then enters the decomposition furnace to calcine and decompose. The decomposition furnace has a temperature of 1200° C. (T6) and a negative pressure of −1.5 kPa (P6), and the calcination is performed for 30 s. The material in the suspended state is rapidly calcined and decomposed in the decomposition furnace, and the decomposition percentage reaches 96% or more. The material is brought into the sixth-stage hot flue gas cyclone C6 again by the hot gas, and then is separated and accumulated by the cyclone of the sixth-stage hot flue gas cyclone C6, at this point, the material entering the rotary kiln is as fluid, and then the material is rotated and tumbled by the rotary kiln, the temperature in the kiln is controlled to 1350° C. (T7), the calcination is performed for 30 min, the material is completely decomposed after a small amount of fuel is burned, and finally is cooled by the cooler to storage after cooling to room temperature. The finished products is produced for 114 tons/hour, about 2700 tons/day. After calculating, the actual yield of calcium oxide goes beyond a calculated target yeild of calcium oxide. Energy consumption per ton of product is 113 kg standard coal, calcium oxide content reaches 96% or more, activity index is 430 or more.

In embodiments 2-7, the gas temperature and negative pressure of the hot flue gas cyclones of each stage, the calcination temperature and negative pressure of the decomposition furnace, the temperature of the rotary kiln, the production capacity, and the quality of calcium oxide are summarized in Table 1.

TABLE 1

| Parameters | Embodiment 2 | Embodiment 3 | Embodiment 4 | Embodiment 5 | Embodiment 6 | Embodiment 7 |
|---|---|---|---|---|---|---|
| T2 (° C.) | 350 | 400 | 420 | 450 | 500 | 550 |
| T3 (° C.) | 450 | 500 | 520 | 550 | 600 | 650 |
| T4 (° C.) | 550 | 600 | 620 | 650 | 700 | 750 |
| T5 (° C.) | 750 | 800 | 820 | 850 | 900 | 950 |

TABLE 1-continued

| Parameters | Embodiment 2 | Embodiment 3 | Embodiment 4 | Embodiment 5 | Embodiment 6 | Embodiment 7 |
|---|---|---|---|---|---|---|
| T6 (° C.) | 850 | 900 | 950 | 1100 | 1150 | 1200 |
| T7 (° C.) | 1200 | 1100 | 1150 | 1200 | 1300 | 1350 |
| P2 (kPa) | 3.4 | 4 | 4.2 | 4.5 | 5 | 5.8 |
| P3 (kPa) | 3.1 | 3.5 | 3.7 | 4 | 4.5 | 4.8 |
| P4 (kPa) | 2.3 | 2.5 | 2.7 | 3 | 3.5 | 3.6 |
| P5 (kPa) | 1.5 | 1.5 | 1.8 | 2 | 2.5 | 2.5 |
| P6 (kPa) | 0.85 | 0.9 | 0.95 | 1 | 1.5 | 1.5 |
| Production capacity (tons/hour) | 95 | 100 | 102 | 108 | 111 | 114 |
| Energy consumption (standard coal kg/ton) | 95 | 95 | 95 | 95 | 100 | 113 |
| Calcium oxide content (%) | 85 | 90 | 94 | 96 | 96 | 96 |
| Activity index | 300 | 360 | 430 | 440 | 440 | 430 |

By comparing embodiments 2 to 7, we can conclude that the gas temperature and pressure in the cyclones in each stage of the multistage suspension preheater kiln influence the quality of the product. The temperature and pressure of embodiment 2 are low, resulting in a low pass rate and the production of a large amount of waste products. Energy consumption is increased in embodiment 7, yet the yield and quality of the product are not significantly improved, suggesting energy waste. At the gas temperature and pressure specified in embodiments 3 to 6, the quality of the products satisfied the requirements for a special class product or a first class product.

Finally, it should be noted that the embodiments above are only intended to illustrate the technical solutions of the present disclosure and not intended to limit the protection scope of the present disclosure. Those skilled in the art will appreciate that the features described above can be combined in various ways to form multiple variations of the disclosure. As a result, such variations fall within the scope of the protection to the present disclosure.

What is claimed is:

1. A method for preparing calcium oxide using a multistage suspension preheater kiln, wherein the method comprises steps of:
   (1) feeding limestone powder to the multistage suspension preheater kiln for preheating to 800° C. to 900° C.;
   (2) feeding a preheated material to a decomposition furnace and calcining at 900° C. to 1100° C. and a negative pressure of −0.9 kPa to −1.5 kPa for 25 s to 35 s;
   (3) feeding a calcined material to a rotary kiln and calcining at 1100° C. to 1300° C. for 25 min to 35 min; cooling to obtain calcium oxide having a purity of 90% or greater;
   wherein the multistage suspension preheater kiln comprises six-stage hot flue gas cyclones that are sequentially connected to a hot gas duct; the six-stage hot flue gas cyclones comprises a first-stage hot flue gas cyclone, a second-stage hot flue gas cyclone, a third-stage hot flue gas cyclone, a fourth-stage hot flue gas cyclone, a fifth-stage hot flue gas cyclone and a sixth-stage hot flue gas cyclone; the hot gas duct conveys hot flue gas upward; the first-stage hot flue gas cyclone on the hot gas duct is the topmost hot flue gas cyclone, and a material outlet of the fifth-stage hot flue gas cyclone connects to an inlet of the decomposition furnace; an end of the hot gas duct is provided with an exhaust device; a material outlet of the first-stage hot flue gas cyclone connects to a hot flue gas outlet duct of the third-stage hot flue gas cyclone, a material outlet of the third-stage flue gas cyclone connects to a hot flue gas outlet duct of the fifth-stage hot flue gas cyclone; a material outlet of the second-stage hot flue gas cyclone connects to a hot flue gas outlet duct of the fourth-stage hot flue gas cyclone; a material outlet of the fourth-stage hot flue gas cyclone connects to a hot flue gas outlet duct of the sixth-stage hot flue gas cyclone; a material at an outlet of the decomposition furnace is fed to a feed pipe of the sixth-stage hot flue gas cyclone through a rising gas flow; a material outlet of the sixth-stage hot flue gas cyclone connects to a flue chamber of the rotary kiln; a raw material of the limestone powder is fed through the hot gas duct between the first-stage hot flue gas cyclone and the second-stage hot flue gas cyclone;
   wherein a gas temperature in the first-stage hot flue gas cyclone is lower than that in the second-stage hot flue gas cyclone;
   the second-stage hot flue gas cyclone has a gas temperature of 400° C. to 500° C. and a negative pressure of −4 kPa to −5 kPa;
   the third-stage hot flue gas cyclone has a gas temperature of 500° C. to 600° C. and a negative pressure of −3.5 kPa to −4.5 kPa;
   the fourth-stage hot flue gas cyclone has a gas temperature of 600° C. to 700° C. and a negative pressure of −2.5 kPa to −3.5 kPa;
   the fifth-stage hot flue gas cyclone has a gas temperature of 800° C. to 900° C. and a negative pressure of −1.5 kPa to −2.5 kPa;
   the sixth-stage hot flue gas cyclone has a gas temperature of 950° C. to 1130° C. and a negative pressure of −1.0 kPa to −2.0 kPa; and
   wherein a particle size of the limestone powder is less than 70 mesh.

2. The method according to claim 1, wherein the hot flue gas is a flue gas that is generated by the decomposition furnace and the rotary kiln.

3. The method according to claim 1, wherein fuel used for calcination in the rotary kiln is petroleum coke.

4. The method according to claim 1, wherein a wind pressure in the rotary kiln is 12 kPa and a rotating speed of the rotary kiln is 3.5 rpm.

* * * * *